(12) United States Patent
Grimminger et al.

(10) Patent No.: US 9,935,311 B2
(45) Date of Patent: Apr. 3, 2018

(54) METHOD FOR MANUFACTURING AN ELECTRODE FOR AN ELECTROCHEMICAL ENERGY STORE AND ELECTROCHEMICAL ENERGY STORE

(71) Applicant: Robert Bosch GmbH, Stuttgart (DE)

(72) Inventors: Jens Grimminger, Leonberg (DE); Marcus Wegner, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 236 days.

(21) Appl. No.: 14/401,777

(22) PCT Filed: Apr. 19, 2013

(86) PCT No.: PCT/EP2013/058180
§ 371 (c)(1),
(2) Date: Nov. 17, 2014

(87) PCT Pub. No.: WO2013/171023
PCT Pub. Date: Nov. 21, 2013

(65) Prior Publication Data
US 2015/0171416 A1    Jun. 18, 2015

(30) Foreign Application Priority Data

May 18, 2012 (DE) .......................... 10 2012 208 311

(51) Int. Cl.
*H01M 4/136* (2010.01)
*H01M 4/1397* (2010.01)
(Continued)

(52) U.S. Cl.
CPC ............. *H01M 4/139* (2013.01); *H01M 4/04* (2013.01); *H01M 4/13* (2013.01); *H01M 4/136* (2013.01);
(Continued)

(58) Field of Classification Search
None
See application file for complete search history.

(56) References Cited

U.S. PATENT DOCUMENTS 3,802,878 A * 4/1974 Lindstrom ............ B22F 3/1134
419/2

FOREIGN PATENT DOCUMENTS

DE          69906814         3/2004
JP          2005158401    *  6/2005 ............ H01M 10/05
(Continued)

OTHER PUBLICATIONS

English translation of JP2005158401 (2005).*
International Search Report for PCT/EP2013/058180, dated Sep. 3, 2013.

*Primary Examiner* — Yoshitoshi Takeuchi
(74) *Attorney, Agent, or Firm* — Norton Rose Fulbright US LLP; Gerard Messina

(57) ABSTRACT

The invention relates to a method for manufacturing an electrode for an electrochemical energy store, including the following steps: a) providing a base body; b) applying an active material matrix to the base body, the active material matrix including at least one binding agent, if necessary, an active material (1), and a pore forming agent (3), the pore forming agent (3) being soluble in a solvent, in which additional components of the active material matrix are insoluble or are soluble only under certain conditions; c) if necessary, drying the active material matrix; d) rinsing out the pore forming agent (3) by treating the active material matrix with the solvent and e) if necessary, introducing an active material into the produced pores of the active material matrix. Using such a method, a high cycle stability of the electrode may be implemented in a particularly simple and cost-effective way. The invention also relates to a method for manufacturing an electrochemical energy store. The inven- (Continued)

tion further relates to an electrode for an electrochemical energy store and to an electrochemical energy store, such as, in particular, a lithium-ion battery.

19 Claims, 1 Drawing Sheet

(51) Int. Cl.
*H01M 4/139* (2010.01)
*H01M 4/04* (2006.01)
*H01M 4/58* (2010.01)
*H01M 10/0525* (2010.01)
*H01M 4/13* (2010.01)
*H01M 4/64* (2006.01)
*H01M 4/02* (2006.01)

(52) U.S. Cl.
CPC ....... *H01M 4/1397* (2013.01); *H01M 4/5815* (2013.01); *H01M 4/64* (2013.01); *H01M 10/0525* (2013.01); H01M 2004/021 (2013.01); H01M 2220/20 (2013.01); Y02T 10/7011 (2013.01)

(56) References Cited

FOREIGN PATENT DOCUMENTS

| WO | WO00/25376 | 5/2000 |
| WO | WO2013/012334 | 1/2013 |

\* cited by examiner

METHOD FOR MANUFACTURING AN ELECTRODE FOR AN ELECTROCHEMICAL ENERGY STORE AND ELECTROCHEMICAL ENERGY STORE

The present invention relates to a method for manufacturing an electrode for an electrochemical energy store. The present invention also relates to a method for manufacturing an electrochemical energy store. The present invention further relates to an electrode for an electrochemical energy store and an electrochemical energy store such as, in particular, a lithium-ion battery.

BACKGROUND INFORMATION

Lithium-based energy stores offer great application potential, since these usually have a high capacity. Secondary lithium and sulfur-based batteries, for example, are promising, for example, in terms of an application in at least partially electrically powered vehicles due to a high, potentially specific capacity of sulfur (1672 mAh/g) and lithium (3862 mAh/g).

A lithium-sulfur battery and a method for the manufacture thereof are known, for example, from the publication DE 699 06 814 T2. According to this publication, a highest possible volumetric density of the electroactive material is to be obtained in the cathode active layer. For this purpose, the electroactive sulfur-containing material is heated in one manufacturing step to a temperature above its melting point, and the melted electroactive sulfur-containing material is resolidified in order to obtain a cathode active layer having a high volumetric density.

SUMMARY OF THE INVENTION

The subject matter of the present invention is a method for manufacturing an electrode for an electrochemical energy store, in particular for a lithium-ion battery, including the following method steps:
a) providing a base body;
b) applying an active material matrix to the base body, the active material matrix including at least one binding agent, if necessary, an active material, and a pore forming agent, the pore forming agent being soluble in a solvent, in which additional components of the active material matrix are insoluble or soluble only under certain conditions;
c) if necessary, drying the active material matrix;
d) rinsing out the pore forming agent by treating the active material matrix with the solvent; and
e) if necessary, introducing an active material into the produced pores of the active material matrix.

A lithium-ion battery may be understood within the scope of the present invention to mean, in particular, an at least partially lithium-based battery, which uses lithium or lithium ions in the electrochemical process of its charge cycle or discharge cycle. For example, a lithium-sulfur battery or also a lithium-air battery may be referred to as a lithium-ion battery. In addition, the term battery may be understood, in particular, to mean a primary cell as well as a secondary cell, thus, in particular, a rechargeable energy store.

A base body within the meaning of the present invention may, in particular, be a base substrate, which may serve as the core of the electrode, and as such, may, for example, at least partially predefine the shape, geometry and/or size of the electrode. For example, a base body may be a current arrester or include one. A current arrester in this case may be understood to mean, in particular, an electrically conductive element, which may pass, for example, from the interior of a cell space, if necessary, through a housing into an area outside the cell space, and thus may be used, in particular, to tap electrical energy of the energy store.

An active material matrix may also be understood to mean, in particular, a layer or a coating, in which the electrochemically active material is at least partially or temporarily situated during a charge operation and/or a discharge operation. The active material in this case may be introduced into the active material matrix before and/or after the pores are produced.

With a method according to the present invention, it may become possible to provide an electrode for an energy store, which offers an improved cycle resistance and high stability along with high capacity.

Such an electrode may offer, in particular, the advantage in which a defined porosity may be producible, but in which the sulfur content may be reduced, whereby comparable capacities may be produced. Merely as an example, the sulfur content may be reduceable to 45% or to even lower levels. In the process, the sulfur content may correlate with the possibilities offered for $Li_2S/Li_2S_2$ deposition, which may result in an increase in the specific capacity of the electrode.

For this purpose, a base body is provided in a first method step a). The base body may be a current arrester, for example, or some other element, which may, for example, be formed as an integral part of an electrode. For example, the current arrester may be formed as a metal foil, including or being made of aluminum or copper, for example.

In the method step b), an active material matrix is applied to or spread on the base body. This may be achieved, for example, by doctoring a suitable mixture. The mixture which is to form the active material matrix, optionally, but not necessarily, includes at least one active material, which may actively participate in the electrochemical processes occurring during a charge operation and/or a discharge operation of the energy store. In this case a single active material, for example, or also a suitable mixture of a plurality of different active materials may be used. Purely exemplary and non-limiting examples of one or multiple active materials include, for example, elementary sulfur or also sulfur compounds for the purely exemplary case of a lithium-sulfur battery. The mixture also includes a binding agent, which may be used, in particular, as the actual matrix material for the mixture, or for the active material matrix to be applied. For example, the binding agent may include a polymer such as, for example, polyvinylidene fluoride (PVDF), cellulose-based binding agents or also Teflon or mixtures thereof. If necessary, the mixture may, in addition to the active material and the binding agent, also contain one or a plurality of solvents, which may give the mixture a suitable consistency for processing. An organic solvent, in particular, may be used as a solvent, for example. One exemplary and non-limiting example mentioned here is N-methyl-2-pyrrolidone (NMP). In addition, such a mixture may also include a pore forming agent. A pore forming agent may be, in particular, a substance present in the mixture, as a solid for example, and may be removed from the active material matrix in a subsequent method step. In this way, a layer to be produced may include a precisely defined number of pores with a precisely defined dimension, whereby the number as well as the dimension of the pores to be formed may be set by selecting a suitable pore forming agent. In particular, an at least partially open porosity is automatically produced in a method as described above.

The pore forming agent in this case may be soluble, in particular, in a solvent, the solvent-based agent to be later removed from the matrix in a method step d), as explained later below. In this case, the pore forming agent or the solvent, in which the pore forming agent is soluble, is further selected in such a way that additional components, in particular, all additional components of the mixture or of the active material matrix produced are insoluble in this solvent, or are soluble in this solvent only under certain conditions. Suitable solubilities for the pore forming agent lie in the range of greater than or equal to 0.05 mol/l, in particular greater than or equal to 0.5 mol/l, whereas solubilities of, for example, the binding agent or the active material or other components of the active material matrix lie in the range of less than 0.05 mol/l, preferably less than or equal to 0.005 mol/l, in each case at a temperature of 25° C., in order according to the present invention to be insoluble, or soluble only under certain conditions.

Furthermore, a conductive additive or a plurality of conductive additives may be present in the active material matrix or in the mixture used to form an active material matrix, which may improve a charge operation or discharge operation during a use of the electrode, for example, in an electrochemical energy store. This may be advantageous, in particular, when the active material, for example, and/or the binding agent per se, or, optionally occurring intermediate products of the active material such as, for example, lithium sulfide and lithium disulfide in the case of a lithium sulfur battery, exhibit a limited electrical conductivity. For example, carbon black and/or graphite may be used as the conductive additive.

After an application of the active material matrix or the aforementioned mixture to the base body, the active material matrix or the base body with the active material matrix may be dried, in order in this way to remove, in particular, the solvent such as, for example, the organic solvent, which may be present in the mixture. For this purpose, the active material matrix may be subjected to a vacuum application and/or to the effects of heat. After drying the active material matrix, a base body such as, in particular, a current arrester, may thus be obtained, on which an active material matrix including a binding agent, if necessary, active material and, if necessary, a conductive additive is situated. Also contained in the active material matrix thus produced is the pore forming agent, with which a precisely defined porosity of the structure of the active material matrix may be set in a further method step d).

In the method step d), in particular, the pore forming agent may be rinsed out by treating the active material matrix with solvent. In other words, this may permit, as described above, a pore forming agent to be used, which is soluble in a solvent, which does not dissolve or dissolves only under certain conditions the other components of the active material matrix such as, in particular, the binding agent and the active material and, if necessary, the conductive additive. In this way, the pore forming agent may be removed from the matrix by the simple action of the solvent on the active material matrix, as a result of which the volumes or cavities previously filled by the pore forming agent particles now form precisely defined pores. The size of the pores may be set by the selection of the pore forming agent particles. For example, by suitably crushing the pore forming agents or the pore forming agent particles, such as by grinding, the desired size of the pores or hollow cavities may be set, since as a result of a subsequent rinsing, cavities having matching dimensions and in matching numbers are formed in place of the pore forming agent particles.

A porous electrode structure may be produced in a particularly simple and cost-effective manner, in particular, by rinsing out the pore forming agent or agents as described above. A particularly precise and defined porosity may be set as a result, because the pore forming agent may be reliably and completely removed from the matrix.

The porous electrode structure thus produced may be dried in a further method step in order to remove the solvent of the pore forming agent.

In addition, active material may be introduced into the pores in a further, optional method step, for example, by melting the active material and subsequently cooling the active material. The active material in this case may be formed as described above. In addition, the active material may be introduced into the active material matrix before and/or after the matrix is dried, and, for example, only at this point in time, or in addition to, for example, being provided in the mixture already applied to the base body. In the latter case, in which the active material is already present in the mixture applied to the base body, the active material at this point need not be introduced.

Thus, according to the present invention, a precisely defined porous electrode structure, in particular a cathode structure, may be manufactured in a particularly simple manner. In this case, the targeted setting of the electrode porosity is essentially independent of the porosity of the materials still being used, such as the conductive additive. In the case of lithium-sulfur batteries, for example, the electrode porosity may thus be set for an optimal cycle stability and at the same time the quantity of sulfur in the cathode may be optimized in accordance with the available conductive surface of the porous matrix, such as a carbon surface. The overall porosity, that is, in particular, the porosity resulting from the dissolving sulfur and resulting from the rinsing out of the pore forming agent, which occurs in addition to the porosity of the conductive additive, for example, of a porous carbon black, of the electrode, such as in particular in the cathode, may therefore be calibrated independently of the quantity of sulfur used. Thus, by avoiding excess sulfur, which potentially may not be completely utilized due to a surface limitation of the conductive additive used, the specific capacity of lithium-sulfur batteries may therefore be optimized, for example, with simultaneous optimal porosity for a high cycle stability.

Thus, the reaction to the manufacture of a particularly defined, porous electrode structure according to the present invention may therefore be that the entire reaction $Li+S_8 \leftrightarrows Li_2S$ for the example of a lithium-sulfur battery includes multiple polysulfide intermediate phases with different sulfur chain lengths, which are readily soluble as a conducting salt in prevalent electrolyte systems such as, for example, 1,3-dioxolane (DOL)/dimethoxyethane (DME) with lithium-bis(trifluoromethyl sulfonylimide)(LiTFSI). The reaction products lithium disulfide ($Li_2S_2$) and lithium sulfide ($Li_2S$), however, are almost insoluble, for example, in the above cited solvents or electrolyte systems, and may therefore precipitate, for example, in the cathodic matrix.

Since lithium sulfide, for example, is approximately 1.8 times higher in volume than elementary sulfur, a discharge operation or charge operation, for example, of a lithium-sulfur battery is associated with a higher volume change in the cathodic structure. This may, in principle, lead to mechanical stresses, which may result in a degradation of the electrode morphology and may, therefore, adversely affect the cycle stability of such a battery. Because in the method according to the present invention a suitable porosity, and therefore additional volume, may be obtained, in addition to the active material present, such as sulfur, an electrode manufactured according to the present invention has a structure, which is able to remain particularly stable in spite of the above-described volume changes over a large number of charge cycles or discharge cycles.

This is because when providing sulfur, which may be present, for example, in particles having a typical diameter of approximately 30 μm, it is possible following the first discharge, in which all of the sulfur is reduced and is able to enter into solution in the form of polysulfides, for cavities having the same dimension to now form where the sulfur particles were originally located, which also remain stable over longer cycle durations of the cell without collapsing. These hollow spaces or pores help provide the cathodic structure with a higher porosity, which may be advantageous for ensuring a uniform permeation of the, for example, cathodic material with polysulfide-containing electrolyte.

Since, in addition to the above-described formation of cavities through the dissolution of sulfur during a discharge operation of the cell, additional defined pores or cavities introduced into an electrode structure manufactured according to the present invention are present, it is possible to increase the available electrically conductive surface, which is required, for example, for the necessary electrical contacting of the electronically non-conductive sulfur, or the electronically non-conductive sulfur species as active material, in the case of cathodes, for example, containing a high percentage of sulfur. The resulting $Li_2S$ or $Li_2S_2$ may be precipitated in the electrode structure or cathode structure and cover the electrically conductive surface available for the reduction, whereby essentially all of the polysulfides dissolved in the electrolyte may be reduced by the large available surface. This may prevent or at least significantly reduce unused active material from remaining in the electrolyte or in an energy store equipped with an electrode manufactured according to the present invention, as a result of which according to the present invention the specific capacity may be increased. The cycle stability may be even further improved as a result of the stability of the pore structure producible according to the present invention.

With the method according to the present invention for manufacturing an electrode or, in particular, a cathode for a lithium-sulfur battery, it is possible to reduce the quantity of sulfur during manufacture, or to adapt it to the conductive surface, for example, carbon surface, available in the cathode. The porosity of an electrode manufactured in this way may be set to the level of the cathode having a higher sulfur content or to any other desired level of cathode having a high cycle stability, with no excess, unused sulfur species remaining in the cell.

In lithium-air batteries as well, the targeted setting of the electrode porosity or cathode porosity may be advantageous, since during a discharge, analogous to lithium-sulfur batteries, a solid, such as lithium oxide in particular, is also precipitated, which may lead to high mechanical stresses in the cathodic structure and may adversely affect the cycle stability. Thus, in the case of lithium-air batteries as well, a manufacturing method for electrodes according to the present invention improves the stability or the cycle stability.

Although electrodes, particularly in the form of cathodes, are discussed above and below, it will be apparent to those skilled in the art that the term electrode may also be understood to mean an anode within the meaning of the present invention.

Within the scope of one embodiment, the pore forming agent may include a salt. Thus, such a pore forming agent may be soluble, particularly in a polar solvent. In this embodiment, a plurality of easily obtainable salts may be used as pore forming agents, which may make the method according to the present invention particularly simple and cost-effective. In addition, suitable mixtures for producing an active material matrix include mostly constituents or components, which are insoluble in polar solvents such as, for example, water or alcohols, in particular, short-chained alcohols, but rather in which non-polar or organic solvents would be required. For example, binding agents mostly in the form of polymers are used, which are insoluble in polar solvents. Moreover, frequently used conductive additives such as graphite, carbon black or other carbon compounds, or even the active material as such are insoluble in polar solvents. In addition, polar solvents, water in particular, are easily obtainable and useable without risk to the environment, so that a method according to the present invention may also be particularly environmentally friendly.

Within the scope of another embodiment, the pore forming agent may include sodium chloride, potassium chloride or barium acetate. Such pore forming agents, in particular, may be easily removed from the electrode structure formed by polar solvents such as, for example, water, in order to therefore produce defined pores in a simple manner. In addition, the size of the particles or salt crystals used, and thus, the pores to be produced, may be set in a particularly precise and simple manner by a processing or targeted production of such crystals or pore forming agent particles.

Within the scope of another embodiment, the pore forming agent may include particles which have a size in a range of larger than or equal to 0.01 μm to smaller than or equal to 50 μm, in particular larger than or equal to 0.1 μm to smaller than or equal to 30 μm. In this embodiment, an electrode structure may be created, which includes pore sizes in which the active material may be particularly advantageously precipitated during a charge operation of an energy store equipped with an electrode manufactured according to the present invention, or which may enter into solution again during a discharge operation, so that a particularly high specific capacity may be achievable. Moreover, in this embodiment, particularly stable electrode structures may be manufactured, which are able to easily withstand the prevailing conditions, for example, during an operation of lithium-ion batteries.

Within the scope of another embodiment, the pore forming agent may be present in the active material matrix in a concentration in a range of greater than 0% by weight to less than or equal to 30% by weight. In this embodiment, the number of pores to be produced, in particular, and thus the pervasion of pores in the electrode structure, may be particularly advantageously set.

In this embodiment, in particular, an electrode structure may be produced, which exhibits a sufficient stability, but at the same time may form sufficient cavities so that the active material may be deposited on the electrically conductive surface during a charge operation, the loss of active material being preventable or reducible to a minimum. In this context, the aforementioned values refer to the finished and dried electrode or active material matrix before the pore forming agent is rinsed out.

Within the scope of another embodiment, an active material matrix may be applied to the base body, which includes:
greater than or equal to 5% by weight to less than or equal to 80% by weight of sulfur,
greater than or equal to 5% by weight to less than or equal to 90% by weight of SPAN,
greater than or equal to 2.5% by weight to less than or equal to 90% by weight of a conductive additive, greater than or equal to 2.5% by weight to less than or equal to 50% by weight of a binding agent,
greater than 0% by weight to less than or equal to 30% by weight of a pore forming agent, and
greater than or equal to 30% by weight to less than or equal to 95% by weight of a solvent.

In this embodiment, sulfur may be considered to be, in particular, elementary sulfur, which may be present in particles of a size of, for example, larger than or equal to 20 μm to a size smaller than or equal to 40 μm. In this embodiment, SPAN may be understood to mean, in particular, a sulfur polyacrylonitrile composite. This may be obtained, for example, by a reaction in which polyacrylonitrile (PAN) is heated with an excess of elementary sulfur, the sulfur on the one hand being cyclized to form a polymer with a conjugated π-system, while forming $H_2S$ with polyacrylonitrile and, on the other hand, being bound in the cyclized matrix. The conductive additive in this embodiment may be, in particular, graphite or carbon black. In this case, for example, only one conductive additive or one mixture of suitable conductive additives may be provided, which together lie within the prescribed concentration range. A binding agent may be understood to mean, in particular, a matrix, which for example, as described above may be formed from a suitable polymer, such as polyvinylidene fluoride (PVDS). The pore forming agent is used, in particular, for forming pores or cavities and, as described above, is rinsed out in a later step. A water-soluble salt, in particular sodium chloride, potassium chloride or barium acetate may be used, for example, as the pore forming agent. The solvent may include or be, in particular, N-methyl-2-pyrrolidone.

It was surprisingly found that, in particular, in one prescribed specific embodiment, a particularly cyclically stable electrode structure could be produced, which may include pores in a suitable number and a suitable size.

Within the scope of another embodiment, an electrode may be manufactured, which has a thickness in a range of greater than or equal to 20 μm to smaller than or equal to 200 μm. In particular, such electrodes could be suited for being able to accommodate pores of a suitable size, which makes a particularly stable cyclic behavior possible. In addition, such electrodes are readily insertable in a wide variety of embodiments, in particular in lithium-ion batteries.

With respect to additional advantages and technical features of this method according to the present invention, explicit reference is made herewith to the explanations in connection with the further method according to the present invention, the electrode according to the present invention, the energy store according to the present invention, the figures and the description of the figures.

The subject matter of the present invention is also a method for manufacturing an electrochemical energy store, in particular a lithium-ion battery, which includes a method for manufacturing an electrode as described above. A method as formed above for manufacturing an electrode may, in particular, be used in a particularly advantageous way in a manufacturing process for an electrochemical energy store such as, in particular, a lithium-ion battery. It may be advantageous, in particular with such energy stores, that an electrode may be manufactured, or be used in this electrochemical energy store, which has a high and definably set porosity, in order thereby to provide essentially the entire active material for a charge operation and/or a discharge operation. In addition, an electrode manufactured in this way may withstand in a particularly advantageous manner volume changes of the active material, as they may occur during a charge operation and/or a discharge operation of an electrochemical energy store.

With respect to additional advantages and technical features of this method according to the present invention, explicit reference is made herewith to the explanations in connection with the further method according to the present invention, the electrode according to the present invention, the energy store according to the present invention, the figures and the description of the figures.

The subject matter of the present invention is also an electrode, which includes a base body such as, in particular, a current arrester, and an active material matrix situated on the base body, the active material matrix including a binding agent, an active material and, if necessary, a conductive additive, a defined porosity being provided in the active material matrix, the pores of which are shaped at least partially similarly to a crystal. Such an electrode, which includes, in particular, such a porous electrode structure may exhibit, in particular, an improved cycle behavior, or, in particular, an improved cycle stability. This may be achieved by providing a porosity, which exceeds the natural porosity forming as a result of dissolution processes of the active material. This makes it possible in a particularly advantageous way for sufficient electrically conductive surface to be available for the entire active material during a charge operation, so that all the active material may be reduced and may be available again for a subsequent discharge operation. In this way, active material may be prevented from precipitating out and no longer being available for another charge operation or discharge operation. Thus, an electrode according to the present invention may have a particularly high capacity, which remains stable even over many charge cycles and discharge cycles. Such an electrode may also be particularly simple to manufacture, in particular, with a method as described above using a salt as a pore forming agent. In detail, the pores may be formed due to the presence of a salt or a salt crystal. The crystals of the pore forming agent used have a shape typical of the corresponding crystal structure such as, for example, a cubic shape in the case of sodium chloride. When these crystals are extracted from the matrix, the cavities then possess at least partially the matching shape. At least partially the matching shape may mean in this case, in particular, that because open pores, in particular, are formed, the pores or the cavities do not reflect completely, or over the entire circumference, the corresponding crystalline shape, but may be opened if necessary.

With respect to additional advantages and technical features of the electrode according to the present invention, explicit reference is made herewith to the explanations in connection with the method according to the present invention, the energy store according to the present invention, the figures and the description of the figures.

The subject matter of the present invention is also an electrochemical energy store, in particular a lithium-ion battery, which includes an anode, a cathode and an electrolyte situated between the anode and the cathode, the energy store including at least one electrode, in particular, a cathode, which is designed as described above. In addition, understandably to those skilled in the art, such an energy store also includes a separator. Such an energy store, in particular, has long-term stability and offers a high cycle stability due to a high capacity, even over many charge operations and discharge operations.

With respect to additional advantages and technical features of the energy store according to the present invention, explicit reference is made herewith to the explanations in connection with the electrode according to the present invention, the method according to the present invention, the figures and the description of the figures

BRIEF DESCRIPTION OF THE DRAWINGS

Additional advantages and advantageous embodiments of the subject matters according to the present invention are illustrated by the drawings and explained in the following description. It should be noted that the drawings are merely descriptive in character and are not intended to limit the present invention in any form.

FIG. 1 shows a schematic representation of an electrode pre-stage during a method step for manufacturing the electrode for an electrochemical energy store. Such an electrode, or such an energy store may be used, for example, as energy sources in portable devices such as, for example, portable computers, mobile telephones and other consumer applications. Other applications include power tools, garden tools as well as electrically-powered vehicles, for example hybrid vehicles or plug-in hybrid vehicles or fully electrically-powered vehicles. On the whole, such an electrode or such an electrochemical energy store may be used in applications in which a high specific energy may be essential.

The method step according to FIG. 1 shows, in particular, an active material matrix, which may be applied to a base body, not shown in FIG. 1, for example, by doctoring. The active material matrix in this step may include a matrix 2, which includes a binding agent and, for example, a conductive additive. Also situated in matrix 2 are particles of an active material 1. FIG. 1 also shows that a pore forming agent 3, or particles of a pore forming agent 3, are situated in matrix 2. Pore forming agent 3 in this case is soluble in a solvent, in which additional components of the active material matrix are insoluble or soluble only under certain conditions.

Figure 1:
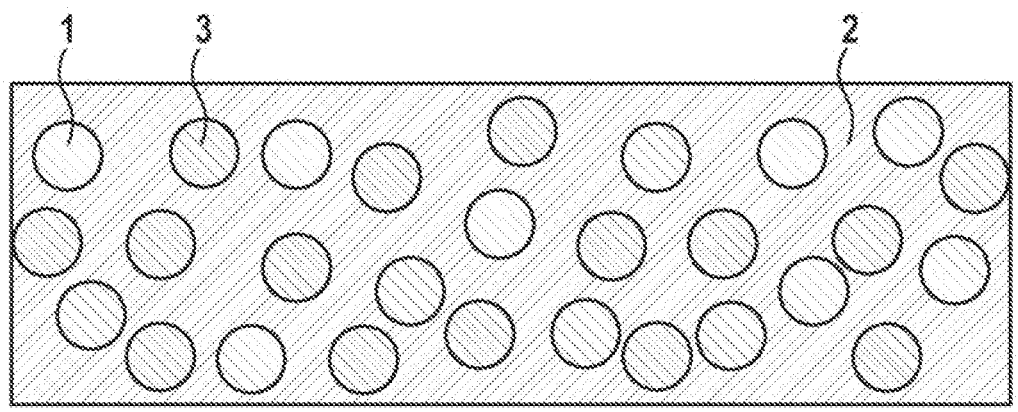
FIG. 1 schematically shows a representation of an electrode pre-stage during a method step for manufacturing the electrode.

Pore forming agent 3 may include, in particular, a salt, which is soluble in a polar solvent, such as water or an alcohol. For example, pore forming agent 3 may include sodium chloride, potassium chloride or barium acetate, or may be made of these components. In addition, pore forming agent 3, in order to produce a particularly advantageous pore size, may have particles, such as salt crystals, which have a size in a range of larger than or equal to 0.01 µm to smaller than or equal to 50 µm, in particular larger than or equal to 0.1 µm to smaller than or equal to 30 µm.

Alternatively or in addition, pore forming agent 3 may be present in the active material matrix in a concentration in a range of greater than 0% by weight to less than or equal to 30% by weight, in order to achieve a particularly advantageous pore permeation. As a concrete, exemplary embodiment, an active material matrix may be applied to the base body, which includes:

greater than or equal to 5% by weight to less than or equal to 80% by weight of sulfur,
greater than or equal to 5% by weight to less than or equal to 90% by weight of SPAN,
greater than or equal to 2.5% by weight to less than or equal to 90% by weight of a conductive additive,
greater than or equal to 2.5% by weight to less than or equal to 50% by weight of a binding agent,
greater than 0% by weight to less than or equal to 30% by weight of a pore forming agent, and
greater than or equal to 30% by weight to less than or equal to 95% by weight of a solvent.

In one exemplary embodiment, a possible manufacturing method includes the following steps. First, active material 1 or a mixture of active materials 1, in particular of sulfur and SPAN, together with a solvent, such as, in particular NMP, are stirred or ground in a speed mixer or in a ball mill for approximately 30 minutes. The conductive additive, such as carbon black, and pore forming agent 3, such as a water soluble salt, are then added. After 10 minutes of additional stirring or grinding, graphite as an additional conductive additive and a binding agent solution may be added. The mixture thus obtained may be stirred for an additional 5 minutes. The slip thus obtained or the mixture thus obtained may applied to a current arrester, such as an aluminum foil using a doctor blade. The electrode pre-stage thus produced may then be dried on a hot plate for 2 hours at 60° C. Afterwards, the electrode pre-stage may then be transferred to a vacuum furnace and dried there for an additional 12 hours at 60° C. The pore forming agent or the salt may then be extracted using distilled water or a corresponding polar solvent and the electrode may be dried once again. A suitable thickness of the manufactured electrode may lie in a range between 20 µm and 200 µm, and may be set, for example, in a doctoring process. An exemplary mixture for forming an active material matrix may include, for example, 60% sulfur, 10% carbon black, 10% graphite, 20% PVDF, whereby the thickness of the dried electrode may be approximately 90 µm.

Figure 2:
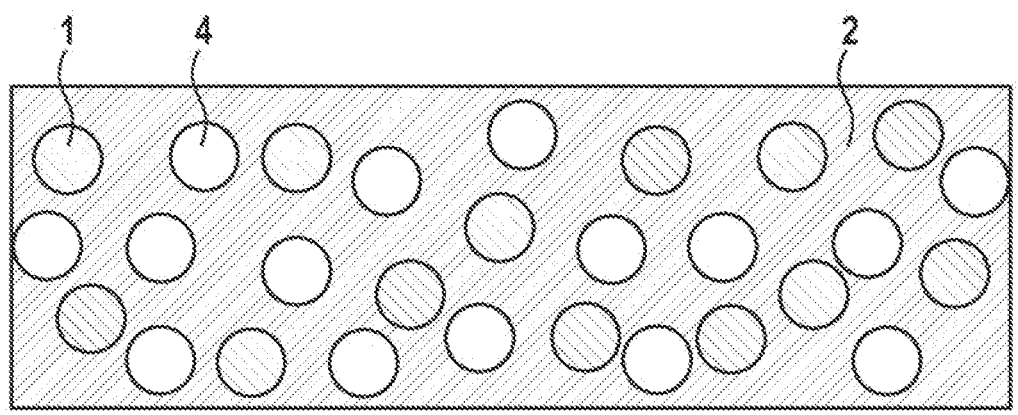
FIG. 2 schematically shows a representation of a finished electrode prior to a first discharge operation.

This results in an active material matrix, which is shown in FIG. 2. FIG. 2 also includes a matrix 2, in which particles of the active material 1 are situated. Pores 4 are also present at those locations at which pore forming agent 3 was previously present.

Thus, FIG. 2 shows a cross section of an electrode in a finished state immediately following the manufacturing process and prior to the first charge operation. After one discharge operation, active material 1 will be able to enter into solution in an electrolyte system and, in a subsequent charge operation, will be able to precipitate or settle in the cavities of active material 1 as well as in pores 4. As a result, after one charge operation, the entire active material 1 is available again for a discharge operation.

What is claimed is:
1. A method for manufacturing an electrode for an electrochemical energy store, comprising:
(1) providing a base body;
(2) applying an active matrix material to the base body, the active matrix material including at least one of each of
a binding agent,
an active material, and
a pore forming agent,
wherein the active material is a material that actively participates in electrochemical processes that occur during a charge operation and/or a discharge operation of the electrochemical energy store, and
wherein the pore forming, agent is soluble in a solvent, in which additional components of the active matrix material are insoluble or soluble only under certain conditions; and
(3) rinsing out the pore forming, agent by treating the active matrix material with the solvent,
wherein the pore forming agent produces pores in the active matrix material, and

(4) the method further comprises introducing the active material into the produced pores of the active matrix material.

2. The method as recited in claim 1, wherein the pore forming agent includes a salt.

3. The method as recited in claim 1, wherein the pore forming agent includes one of sodium chloride, potassium chloride, and barium acetate.

4. The method as recited in claim 1, wherein the pore forming agent includes particles, a size S of the particles being in a range of 0.01 μm≤S≤50 μm.

5. The method as recited in claim 1, wherein the pore forming agent includes particles, a size S of the particles being in a range of 0.1 μm≤S≤30 μm.

6. The method as recited in claim 1, wherein the pore forming agent is present in the active matrix material in a concentration in a range of greater than 0% by weight to less than or equal to 30% by weight.

7. The method as recited in claim 6, wherein the active matrix material includes:
- greater than or equal to 5% by weight to less than or equal to 80% by weight of sulfur,
- greater than or equal to 5% by weight to less than or equal to 90% by weight of SPAN,
- greater than or equal to 2.5% by weight to less than or equal to 90% by weight of a conductive additive,
- greater than or equal to 2.5% by weight to less than or equal to 50% by weight of a binding agent,
- greater than 0% by weight to less than or equal to 30% by weight of a pore forming agent, and
- greater than or equal to 30% by weight to less than or equal to 95% by weight of a solvent.

8. The method as recited in claim 1, wherein a thickness T of the electrode that is manufactured is in a range of 20 μm≤T≤200 μm.

9. The method of claim 1, further comprising drying the active matrix material.

10. The method of claim 1, wherein the manufactured electrode is configured for inclusion in a lithium-ion battery as the electrochemical energy store.

11. The method of claim 1, wherein the active matrix material further includes a conductive additive.

12. The method of claim 1, wherein the pore forming agent produces in the active matrix material pores that are at least partially crystal shaped.

13. The method of claim 1, wherein the base body is a current arrester.

14. The method of claim 1, further comprising using the pore forming agent to set a defined porosity of the active matrix material.

15. The method of claim 1, wherein the manufactured electrode is configured for inclusion as one of an anode and a cathode that are included in the electrochemical store with an electrolyte situated between the cathode and anode.

16. The method of claim 15, wherein the manufactured electrode is configured for inclusion in a lithium-ion battery as the electrochemical energy store.

17. The method of claim 1, wherein the manufactured electrode is configured for inclusion as a cathode that is included in the electrochemical store with an anode and an electrolyte situated between the cathode and anode.

18. The method of claim 1, wherein the manufactured electrode is configured for inclusion as a cathode of the electrochemical store.

19. A method for manufacturing an electrode for an electrochemical energy store, comprising:
(1) providing a base body;
(2) applying an active matrix material to the base body, the active matrix material including at least one of each of
- a binding agent,
- an active material, and
- a pore forming agent,
the pore forming agent being soluble in a solvent, in which additional components of the active matrix material are insoluble or soluble only under certain conditions; and
(3) rinsing out the pore forming agent by treating the active matrix material with the solvent,
wherein the pore forming agent is present in the active matrix material in a concentration in a range of greater than 0% by weight to less than or equal to 30% by weight, and
wherein the active matrix material includes:
- greater than or equal to 5% by weight to less than or equal to 80% by weight of sulfur,
- greater than or equal to 5% by weight to less than or equal to 90% by weight of SPAN,
- greater than or equal to 2.5% by weight to less than or equal to 90% by weight of a conductive additive,
- greater than or equal to 2.5% by weight to less than or equal to 50% by weight of a binding agent,
- greater than 0% by weight to less than or equal to 30% by weight of a pore forming agent, and
- greater than or equal to 30% by weight to less than or equal to 95% by weight of a solvent.

* * * * *